E. POLLARD.
STOVE FOR HEATING WATER OR GENERATING STEAM.
APPLICATION FILED JUNE 22, 1911.
1,003,947.
Patented Sept. 19, 1911.
5 SHEETS—SHEET 1.
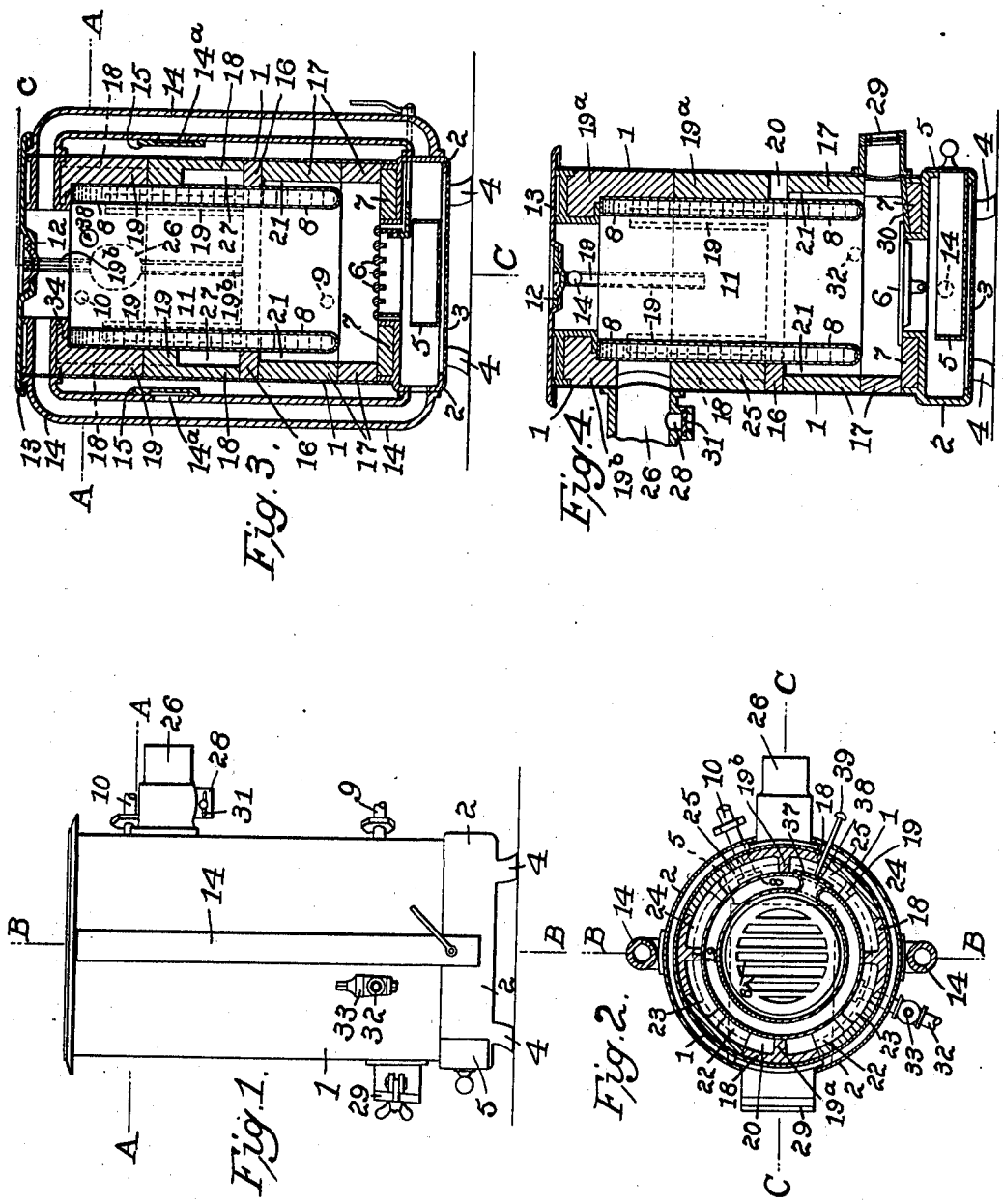

E. POLLARD.
STOVE FOR HEATING WATER OR GENERATING STEAM.
APPLICATION FILED JUNE 22, 1911.
1,003,947.
Patented Sept. 19, 1911.
5 SHEETS—SHEET 2.
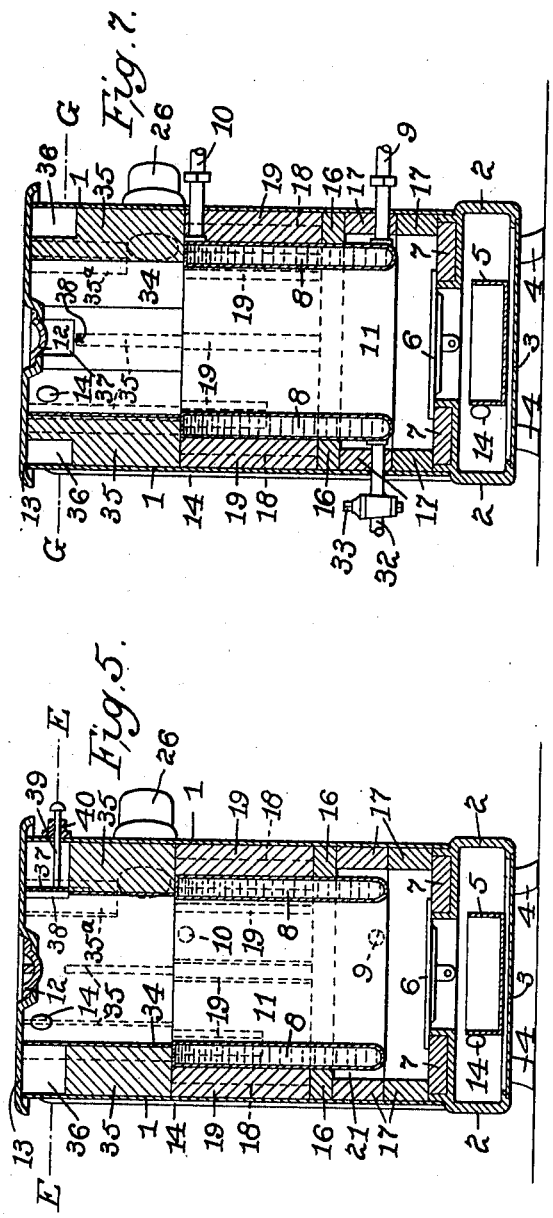
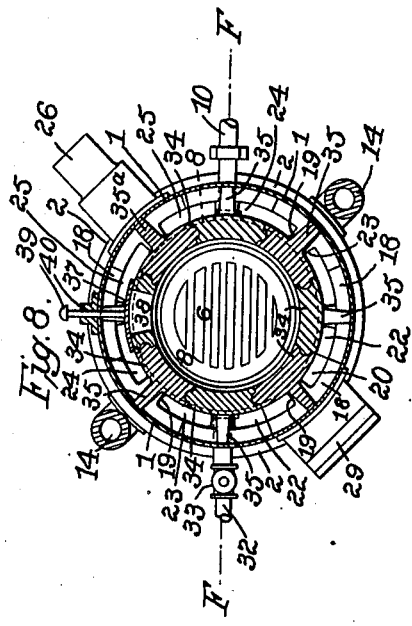
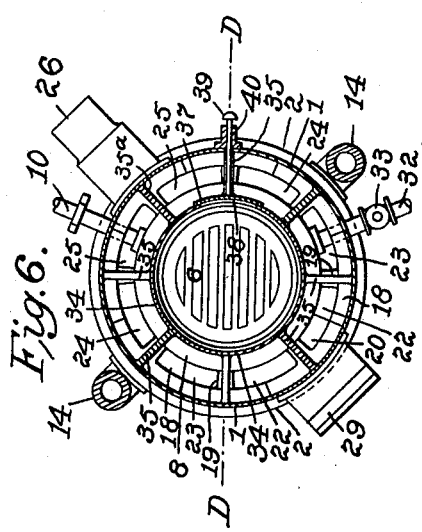
Attest:
Ewd L. Tolson
Bent M. Stahl
Inventor:
Edwin Pollard,
by Spear, Middleton, Donaldson & Spear
Attys.

E. POLLARD.
STOVE FOR HEATING WATER OR GENERATING STEAM.
APPLICATION FILED JUNE 22, 1911.
1,003,947.
Patented Sept. 19, 1911.
5 SHEETS—SHEET 3.
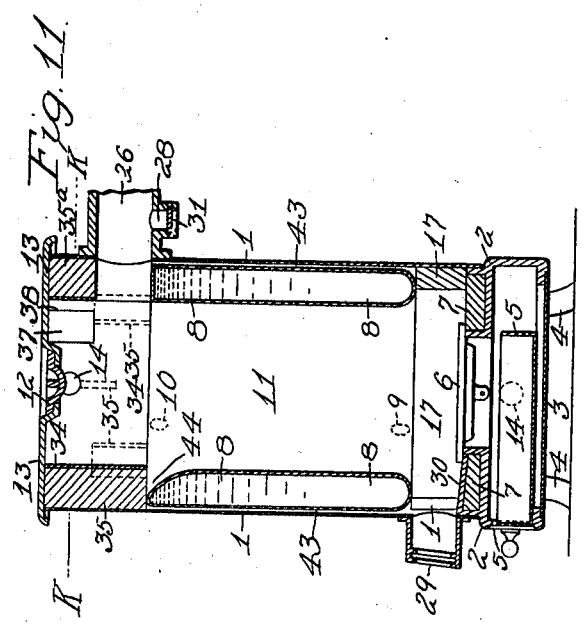
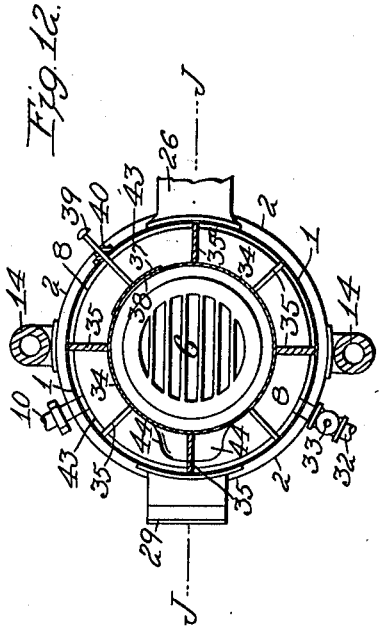
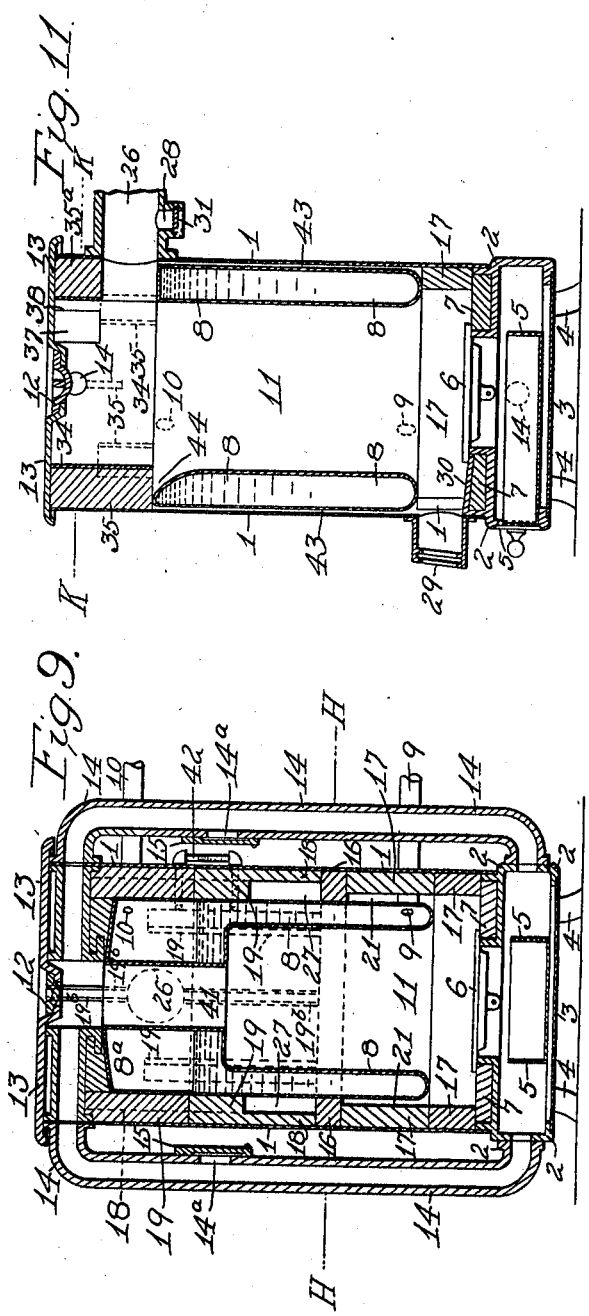
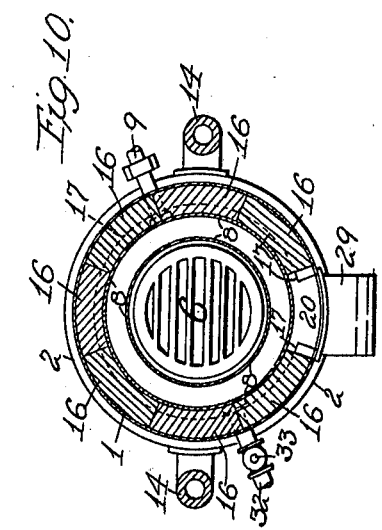
Inventor.
Edwin Pollard.

E. POLLARD.
STOVE FOR HEATING WATER OR GENERATING STEAM.
APPLICATION FILED JUNE 22, 1911.

1,003,947.

Patented Sept. 19, 1911.
5 SHEETS—SHEET 4.

Inventor.
Edwin Pollard

Attest:
Bent. M. Stahl
Ed. L. Tolson

By Spear, Middleton, Donaldson & Spear
Attys.

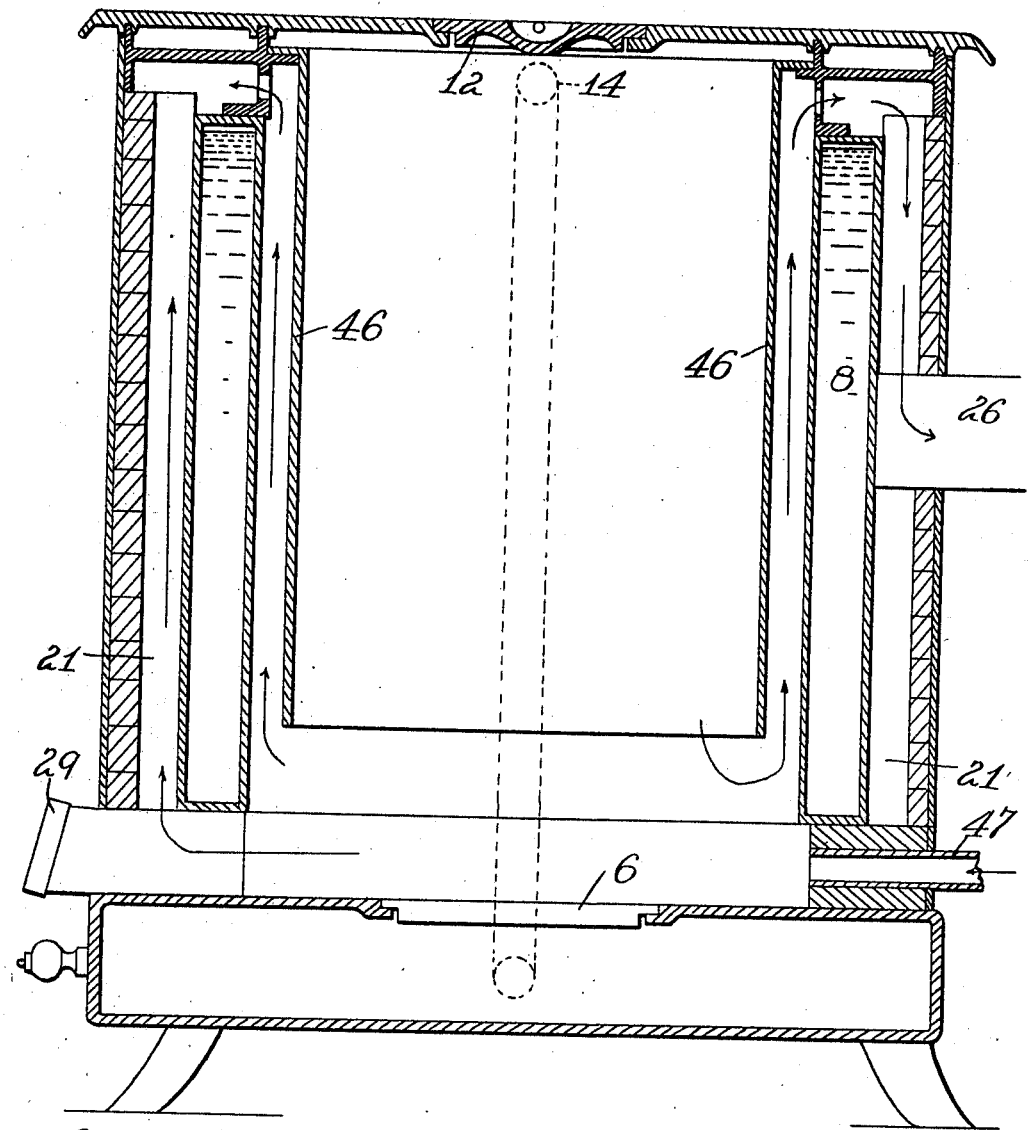

UNITED STATES PATENT OFFICE.

EDWIN POLLARD, OF EAGLEHURST, DOUGLAS, ISLE OF MAN, ENGLAND.

STOVE FOR HEATING WATER OR GENERATING STEAM.

1,003,947. Specification of Letters Patent. Patented Sept. 19, 1911.

Application filed June 22, 1911. Serial No. 634,780.

*To all whom it may concern:*

Be it known that I, EDWIN POLLARD, a subject of the King of Great Britain and Ireland, residing at Eaglehurst, Douglas, Isle of Man, England, have invented new and useful Improvements in Stoves for Heating Water or Generating Steam, of which the following is a specification.

This invention relates to stoves for heating water and generating steam and has for its object to provide an improved form of such apparatus which shall be very efficient and reliable in service.

Figure 13:
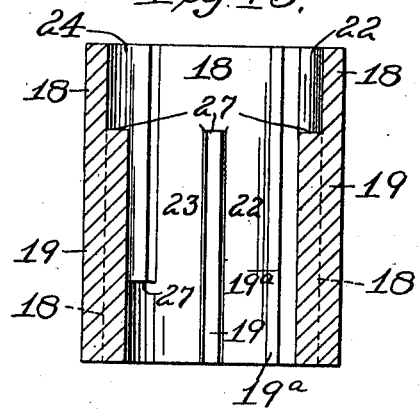
Figure 14:
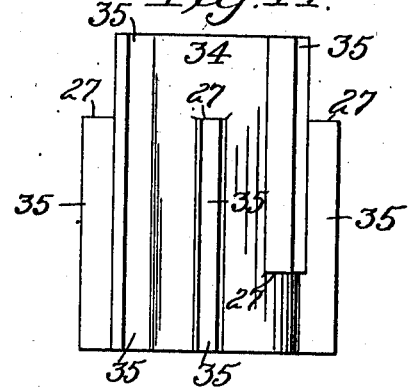
Figure 15:
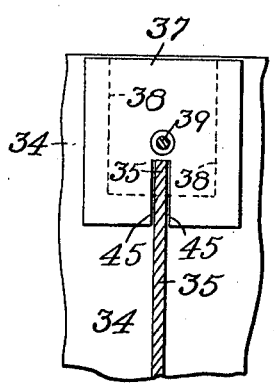
Figure 16:
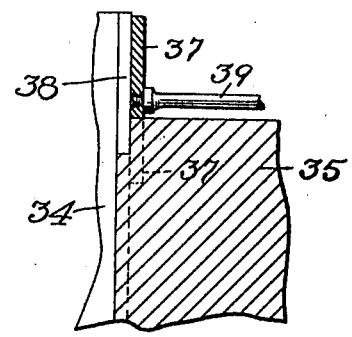

Referring to the accompanying sheets of explanatory drawings;—Figure 1 is an outside elevation of the stove or water heating apparatus. Fig. 2 is a sectional plan view of the apparatus shown at Fig. 1, the section being taken on the line A A of Figs. 1 and 3. Fig. 3 is a sectional elevation on the line B B of Figs. 1 and 2. Fig. 4 is a sectional elevation on the line C C of Figs. 2 and 3. Fig. 5 is a sectional elevation on the line D D of Fig. 6 showing a modified form of stove or water heater. Fig. 6 is a sectional plan view on the line E E of Fig. 5. Fig. 7 is a sectional elevation on the line F F of Fig. 8 showing a modified form of the apparatus shown at Fig. 5. Fig. 8 is a cross section on the line G G of Fig. 7. Fig. 9 is a sectional elevation of a stove adapted for steam generating purposes. Fig. 10 is a cross section on the line H H of Fig. 9. Fig. 11 is a sectional elevation on the line J J of Fig. 12 showing a further modified form of stove. Fig. 12 is a cross section on the line K K of Fig. 11. Fig. 13 is a detail view, in cross section, of the ribs or deflectors shown at Figs. 2, 3, 4 and 9. Fig. 14 is a detail view, in outside elevation, of the upper series of ribs or deflectors shown at Figs. 7 and 8. Figs. 15 and 16 are detail views of the damper to be hereinafter referred to. Fig. 17 is a sectional elevation of a further modified form of water heater constructed in accordance with my invention.

The same reference letters in the different views indicate the same or similar parts.

The stove or water heating apparatus illustrated at Figs. 1 to 4, comprises an outer cylindrical shell or casing 1, preferably of sheet steel, mounted upon a hollow base 2 which is closed at the bottom by a plate 3 and is raised somewhat from the ground upon feet 4. The hollow base 2 is fitted with a slidable and removable ash pan 5 and a loose fire grate 6 preferably provided with means for agitating it and of clearing it of ashes. The space between the outer shell 1 and the fire grate is filled in with fire brick or other refractory material 7 to form a hearth. Within the outer shell 1 is fitted a double walled hollow cylinder 8, the space between the walls forming a boiler which is provided with the usual water circulating pipes 9 and 10 which also serve to support the boiler 8 in position in the stove, the boiler being raised above the hearth 7 as shown at Figs. 3 and 4. The fuel is fed into the hollow part 11 of the boiler, termed the fuel chamber, by way of a removable charging door 12 in a cover 13 which is preferably detachably fitted on the outer shell 1, the upper part of the stove above the boiler 8 being provided with an inner cylindrical shell or casing 34 forming a charging opening. The gases and unburned products of combustion in the upper part of the stove are conducted to the base 2 by way of tubular connections 14 leading from the cylindrical casing 34, the gases and unburned products of combustion passing upward through the fire and being burned therein, and air being mixed therewith, if desired, by way of valves 15 fitted to apertures 14ª in the tubular connections 14.

In order to utilize the heat from the burned gases, I interpose a series of deflectors, see also Fig. 13, between the boiler 8 and the outer shell 1, and around the upper part of the stove, the deflectors being arranged above a ring 16 of firebricks or other refractory material, the ring 16 being supported upon a lining 17 of similar material and a space 21 being left between the boiler 8 and the lining 17 for the circulation of the burned gases. The deflectors preferably comprise rings 18 of firebrick, cast iron or other material, having radial ribs 19 at intervals forming channels 22, 23, 24 and 25, the burned gases being admitted to the channels by way of an opening 20 in the ring 16 which may be formed by the omission of a brick, see also Fig. 10. The ribs or deflectors 19 are cut away alternately at the top and bottom at 27 for the passage of the gases which, after circulating in the space 21 around the lower part of the boiler, rise through the opening 20, centrally over which is arranged a rib or deflector 19ª extending from the top of the stove to the ring 16 in such a manner as to divide the gases passing through the opening 20, the gases ascending the channels 22, 22 on each side thereof and heating the upper part of the boiler and passing from thence in a sinuous or circuitous path through the channels 23, 24 and 25, and alternately over and under the intervening ribs 19, the gases descending the channels 23 and 25 and ascending the channels 24, the channels 25 being in communication with a flue 26 and being divided above and below the flue 26 by short ribs 19$^b$. It will thus be seen that the products of combustion travel a circuitous path with relation to the outer face of said water vessel or in other words, while traveling said circuitous path they are always in heating contact or relation to the outer circumference or periphery of the water vessel or boiler. To further reduce the consumption of fuel when desired, I provide the flue 26 with a small air inlet pipe 28 having a damper 31 or other suitable valve for admitting cold air to the chimney.

The usual fire door 29 is fitted at the front of the stove, and this door may, if desired, be provided with a sheet of mica or other transparent and refractory material, the hearth 7 being preferably inclined away from the fire door 29 and protected with a cast iron plate or like covering 30.

The boiler 8 is preferably provided with the usual draw off pipe 32 and a cock or valve 33, the circulating pipes 9 and 10 and the draw off pipe 32 being passed through the firebrick lining and thereby sustaining the boiler 8 in position but if desired, the boiler may also be provided with additional means of support.

In order to produce an upward draft through the stove when lighting the fire, a damper or other suitable valve 37 is provided to close or open an aperture 38 formed in the boiler 8, the damper 37 being operated by a rod 39 passing through a suitable gland 40 upon the outer shell 1. When lighting the fire, the aperture 38 can be opened by drawing back the damper 37, thereby allowing the gases and unburned products of combustion to pass directly into the channel and from thence to the flue 26.

In the arrangement shown at Figs. 5 and 6, means are provided for radiating the heat externally and for this purpose the stove is fitted with two series of deflectors, the upper series being adapted to direct the hot gases against the outer shell 1.

As shown at Fig. 5, I employ a somewhat shorter boiler 8, the arrangement of the deflectors 19 around the boiler being identical with that shown at Figs. 1 to 4. Above the boiler 8 is arranged a second series of deflectors 35, preferably of cast iron, extending across the cavity between the outer shell 1 and the inner cylindrical casing 34, the alternate deflectors being cut away or otherwise provided with apertures 36 at the top of the stove for the passage of the hot gases, and the deflector 35$^a$ being preferably cut away for the passage of the gases to the flue 26. The two series of deflectors 19 and 35 together form continuous channels through which the gases ascend and descend respectively in the manner described with reference to Figs. 1 to 4, the gases in the lower part of the stove heating the boiler 8 and the gases in the upper part heating the outer shell 1 and thereby radiating the heat externally. Similar means are provided for producing an upward draft through the stove when lighting the fire, the aperture 38 being provided in the inner casing 34, and the damper 37 (see also Figs. 15 and 16) being slotted at 45, so as to fit over one of the cast iron deflectors 35 and be guided thereby.

As shown at Figs. 7 and 8, I may if desired construct the whole of the deflectors of firebrick or similar refractory material, the firebricks forming the inner casing 34, and the ribs thereof corresponding to the cast iron deflectors 35, the bricks being preferably jointed together by means of tongue and groove joints. The lower edge of the damper 37 in this case, is adapted to rest upon and slide over the cut-away portion of one of the ribs or deflectors 35 but in other respects the arrangement shown at Figs. 7 and 8 is identical with that shown at Figs. 5 and 6.

Fig. 9 which shows my improved stove adapted for the generation of steam is almost identical with the arrangement shown at Figs. 1 to 4, the distinguishing feature being the employment of a steam boiler 8, the lower part of which is in the form of a double walled hollow cylinder, and the upper part in the form of a steam space 8$^a$ having a central opening 41 for fuel charging and for the escape of the gases and unburned products of combustion, the steam boiler having a feed water inlet 9 and a steam outlet 10 which latter may be fitted with the usual pressure gage and safety valve. The usual water gage 42 may also be provided. If desired, a separate steam space may be provided in communication with the steam space 8$^a$ for the purpose of relieving the steam pressure therein.

As shown at Figs. 11 and 12, I may if desired arrange the boiler 8 so as to nearly fill the outer shell 1, and thereby dispense with the use of deflectors around the boiler. In this case the burned gases from the underside of the fire may circulate in the space 43 between the outer wall of the boiler and the outer shell of the stove, thereby heating the boiler and radiating the heat externally. The burned gases also pass by way of an opening or depression 44 in the boiler, to a series of deflectors 35 mounted above the boiler and arranged between the outer shell 1 and the inner shell or casing 34, these deflectors being similar in arrangement to the deflectors hereinbefore described, the gases passing away to the flue 26. Means similar to those already described, are provided for conducting the gases and unburned products of combustion to the underside of the fire grate, for causing an upward draft when starting the fire, and for admitting cold air to the gases and unburned products of combustion or to the fire.

If desired, the gases and unburned products of combustion from the top of the fire may be admitted directly to the deflectors 19 or 35 by way of a passage or opening through the boiler 8 or over the top of the boiler.

In the arrangement illustrated at Fig. 17 the water chamber 8 rests upon the brickwork around the fire grate 6, and between said chamber and the fire space or fuel chamber of the boiler is interposed a cylindrical shell 46 which provides an annular air space between itself and the said water space. The cold air inlet 47 is arranged at the side of the grate 6 opposite to the door 29 so that the air entering the apparatus must pass through the fire before gaining access to the circulating passage 21 around the water chamber 8 and to the annular space between 46 and 8 which communicates with said circulating passages. The latter provide for a circuitous path of the hot gases in the same manner as do the similar passages in the other forms of apparatus hereinbefore described.

Having now described my invention, what I claim as new and desire to secure by Letters Patent is:—

1. In water heaters, in combination, a fire grate, a water vessel around the fire space, means for admitting air to the heater, an exit flue, and means causing the products of combustion to travel through the fire and in a circuitous path with relation to the exterior surface of said water vessel before passing to said flue, as set forth.

2. In water heaters, in combination, a fire grate, a water vessel around the fire space, an external shell, means for admitting air to the heater, an exit flue and means causing the products of combustion to travel through the fire and in a circuitous path between the water vessel and external shell before passing to said flue, as set forth.

3. In water heaters, in combination, a fire grate, a fuel chamber above said grate, a fuel charging door, a water vessel around the fuel chamber, an external shell, a chamber beneath the fire grate, means connecting the upper end of said fuel chamber with said chamber beneath the fire grate, means forming a passage circuitous with relation to the outer surface of said water vessel, an exit flue, and means for admitting air to the heater, as set forth.

4. In water heaters, in combination, a fire grate, a water vessel around the fire space, means for admitting air to the heater, an exit flue, means causing the hot products of combustion to travel through the fire and in a circuitous path through the heater before passing to said flue, and means for admitting the products of combustion direct to said flue, as set forth.

5. In water heaters, in combination, a fire grate, a fuel chamber above said grate, a fuel charging door at the upper end of said chamber, a water vessel around the fuel chamber, an external shell, a chamber beneath the fire grate, means connecting the upper end of said fuel chamber with said chamber beneath the fire grate, means forming a circuitous path around the outer surface of the water vessel and between said water vessel and external shell, an exit flue, and means for admitting air to the heater, as set forth.

6. In water heaters, in combination, a fire grate, a fuel chamber above said grate, a fuel charging door, an annular water vessel, a cylindrical shell between said fuel chamber and water vessel, an air passage between said shell and vessel, an external shell, and means causing the products of combustion to travel through the fire and in a circuitous path through the heater, as set forth.

7. In water heaters, in combination, a fire grate, a fuel chamber above said grate, a fuel charging door, an annular water vessel, a cylindrical shell between said fuel chamber and water vessel, an air passage between said shell and vessel, an external shell, a chamber beneath the fire grate, means connecting the fuel chamber with said chamber beneath the fire grate, means forming a circuitous passage between said water vessel and external shell, an exit flue, and means for admitting air to the heater.

8. In water heaters, in combination, a fire grate, a fuel chamber above said grate, a fuel charging door, a water vessel around the fuel chamber, an external shell, a chamber beneath the fire grate, means connecting said fuel chamber with the chamber beneath the fire grate, means forming a circuitous path between said water vessel and external shell, an exit flue, and means opposite the entrance to said circuitous path for admitting air to the fuel chamber, as set forth.

9. In water heaters, in combination, a fire grate, a fuel chamber above said grate, a fuel charging door, an annular water vessel, a cylindrical shell between said fuel chamber and water vessel, an air passage between said shell and vessel, an external shell, a chamber beneath the fire grate, means connecting said fuel chamber with said chamber beneath the fire grate, means forming a circuitous path between said water vessel and external shell, an exit flue, and means opposite the entrance to the circuitous path for admitting air to the fuel chamber, as set forth.

In testimony whereof I have signed my name to this specification in the presence of two subscribing witnesses.

EDWIN POLLARD.

Witnesses:
 PERCY CORRIS,
 HENRY POLLARD.

Copies of this patent may be obtained for five cents each, by addressing the "Commissioner of Patents, Washington, D. C."